United States Patent [19]

Stoll

[11] 4,452,128

[45] Jun. 5, 1984

[54] ACTUATOR

[76] Inventor: Kurt Stoll, Lenzhalde 72, 73 Esslingen am Neckar, Fed. Rep. of Germany

[21] Appl. No.: 267,821

[22] Filed: May 27, 1981

[30] Foreign Application Priority Data

May 29, 1980 [DE] Fed. Rep. of Germany ....... 3020390

[51] Int. Cl.³ .......................... F16J 11/02; F16J 15/18
[52] U.S. Cl. ........................................ 92/163; 92/164; 92/168; 92/170; 285/DIG. 22
[58] Field of Search ................. 92/168, 169, 170, 163, 92/164; 285/DIG. 22; 403/308

[56] References Cited

U.S. PATENT DOCUMENTS

| 2,451,089 | 10/1948 | Hunter | 92/168 |
| 2,923,276 | 2/1960 | Flick et al. | 92/168 |
| 3,040,712 | 6/1962 | Harrah | 92/170 |
| 3,784,235 | 1/1974 | Kessler et al. | 285/DIG. 22 |

FOREIGN PATENT DOCUMENTS

| 2452748 | 6/1974 | Fed. Rep. of Germany. |
| 2807508 | 8/1979 | Fed. Rep. of Germany ... 285/DIG. 22 |

Primary Examiner—Paul E. Maslousky

[57] ABSTRACT

An actuator is made up of a piston, a cylinder and cylinder endpieces fluid-tightly fixed to the ends of the cylinder. Each endpiece has a skirt tightly placed around an end part of the cylinder. The outer face of an end part of the cylinder and the opposite inner face of a skirt resting against it have cooperating locking parts and a fluid-tight joint is produced between them by a gasket acted upon by a radial or lengthways force.

12 Claims, 3 Drawing Figures

ACTUATOR

Field of the Invention

The present invention relates to a pressure fluid actuator having a piston, cylinder and cylinder endpieces fixed fluid-tightly on the ends of the cylinder.

Background of the Invention

In the prior art, the endpieces of such actuators have been screwed onto or fixed by welding or adhesives to the ends of the actuator and although this form of joint gives the desired fluid-pressure-tight connection, the putting together of the different parts of the actuator is generally slow and may only be undertaken by workers giving careful attention thereto to make certain that the pressure line connections on the cylinder endpieces are in the desired position in relation to each other. However, it is more specially in the case of small-size actuator that the price of such work is of special weight, such actuators being needed in great numbers for example as parts of servo systems for low power uses.

Summary of the Invention

One purpose of the present invention is that of designing an actuator of the sort noted in such a way that, while keeping a high-level of sealing effect between the endpieces and the ends of the cylinder, the parts of the unit may be put together more simply.

For effecting this purpose and further purposes, each cylinder endpiece has a skirt tightly placed, in each case, around one end of the cylinder, an inner face within each said endpiece and an outer face on said cylinder covered thereby having cooperating resilient locking parts, the skirts and the cylinder ends being fluid-tightly joined together by a gasket acted upon by faces on the skirt and on the cylinder with a pre-loading effect, for example so that the gasket is forced together radially or axially.

Actuators of the present invention may be simply put together by pushing the cylinder endpieces axially onto the ends of the cylinder so that the cylinder and the cylinder endpieces are locked together by the locking parts axially in relation to each other. Because of the use of a gasket with a radial or axial pre-loading force acting on it, it is possible to make certain of a good seal between the inside of the cylinder and the outside, even if there are tolerances in the sizes and positions of the locking parts and the ends of the cylinder of the actuator.

Further useful developments of the invention will be seen in the dependent claims.

In a design of the invention in which the gaskets between the cylinder endpieces and the cylinder are acted upon by axial forces for pre-loading the gasket, it is possible to make certain that the seal between the cylinder endpieces and the cylinder is in no way dependent on the axial position, which may be different from case to case, of the endpieces in relation to the cylinder.

If the design is such that the end of the cylinder has a groove in its outer face taking up a locking tooth or lip within the skirt and if the skirt part between this groove and the end of the cylinder has an inner diameter which is generally the same as the floor of the groove in the barrel and comes to an end at a sloping face next to the groove, it is possible to do without any separate, special groove, placed at the end of the skirt or the end of the cylinder, for a gasket. This is more specially of value if the cylinder and the skirt of the cylinder end piece only have a generally low wall thickness, bacause, in this case, if there were to be a gasket groove, the strength of the cylinder or of the skirt would be weakened at a given point.

As part of a further useful effect produced by the invention, it is more readily possible to take care of axial manufacturing tolerances in the locking parts and in the axial size of the actuator cylinder without the force acting axially on the gasket becoming overly high. Nevertheless, a high-quality gasketing effect is produced because the gasket is acted upon on its inner face by the working fluid pressure within the actuator.

Another useful effect produced by the invention is that the endpieces of the actuator may readily be turned in relation to the actuator cylinder so that such turning may take place later, even at the point of use of the actuator, for getting the desired position between the pressure line connections joined up with cylinder endpieces.

A further useful effect of the invention is that the endpieces are kept in position not only when acted upon by pulling, but furthermore when acted upon by pushing forces.

A further useful effect is that the locking parts are spaced from the end of the cylinder of the actuator without making it any harder for the endpieces to be slipped onto the ends of the cylinder. A further useful effect produced by such an axial positioning of the locking parts is that an elastic change in the shape of the skirts of the endpieces is possible when such endpieces are slipped onto the ends of the actuator's cylinder.

A further useful effect produced with the present invention is that only a light force is needed for pushing and slipping the cylinder endpieces onto the ends of the cylinder.

With a further development of the invention, it is possible to make certain that the skirts of the endpieces may be belled out in a circumferential direction more readily, this being made possible by grooves which have the further useful effect of making it easier for the endpieces to be turned after they have been pushed on to the ends of the actuator cylinder.

The cylinder and its endpieces may be made of a high-impact, somewhat elastic synthetic resin, this making it simpler for the actuator to be mass produced, the elastic properties of the material being of value with respect to the function of the elastic locking parts.

In the case of a further development of the invention, the connections for fluid-pressure lines are made so that they may be turned readily, such adjustment being possible even after the actuator has been fully put together.

Further developments are designed for cushioning the piston in the cylinder when it comes into its end position, the design furthermore being such that, in this respect as well, the actuator may be readily and simply produced.

It is furthermore possible for the one endpiece, through which the piston rod extends to have an inner groove for taking up a piston rod stripper ring without any separate fixing system being needed for such ring.

Brief Description of the Drawings

A detailed account will now be given of two working examples of the invention which are illustrated in the figures.

Detailed account of working examples of the invention

Figure 1A:
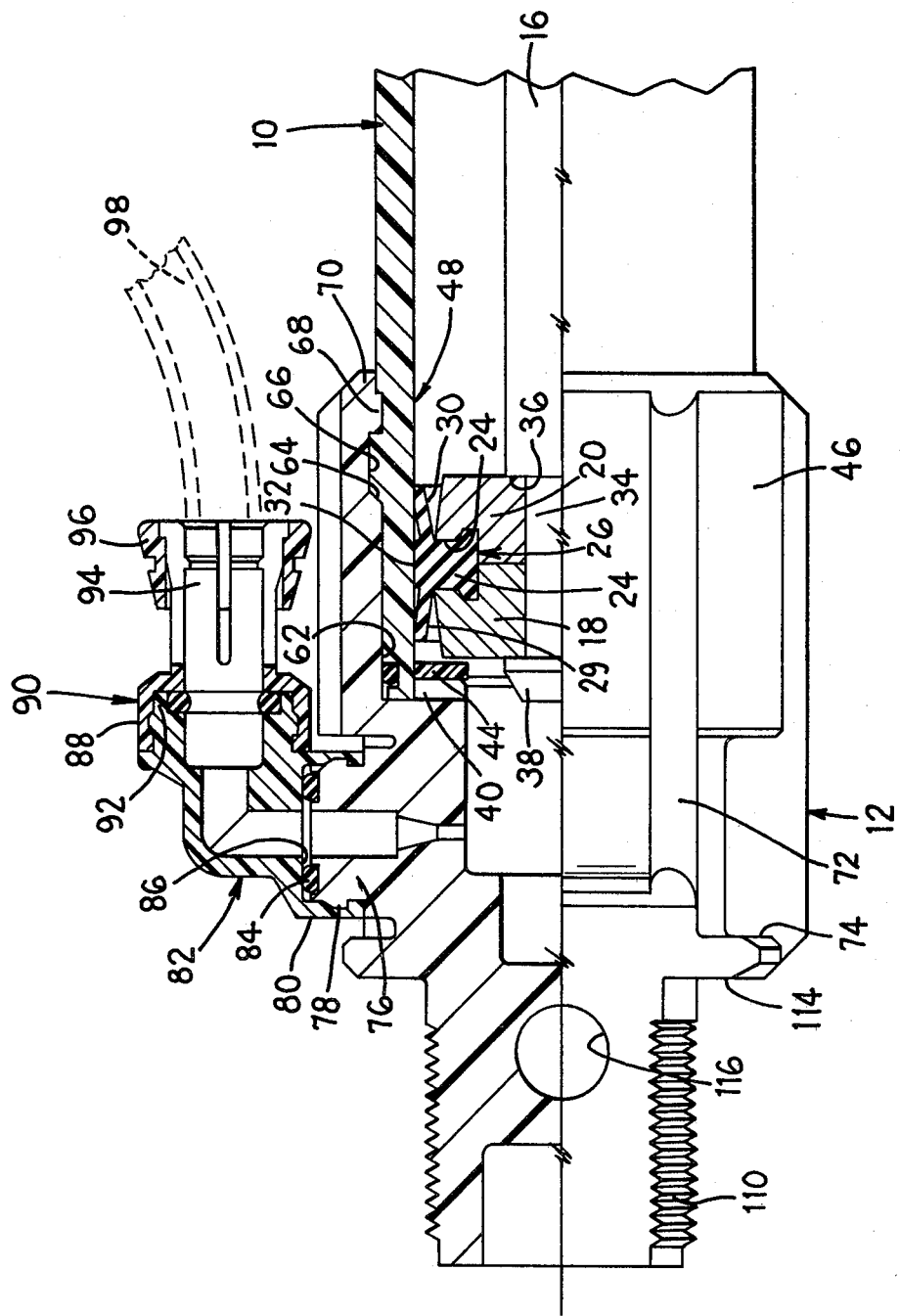
FIGS. 1A and 1B are respective portions of a sectional side view of a low-power compressed air actuator embodying the present invention.
Figure 1B:
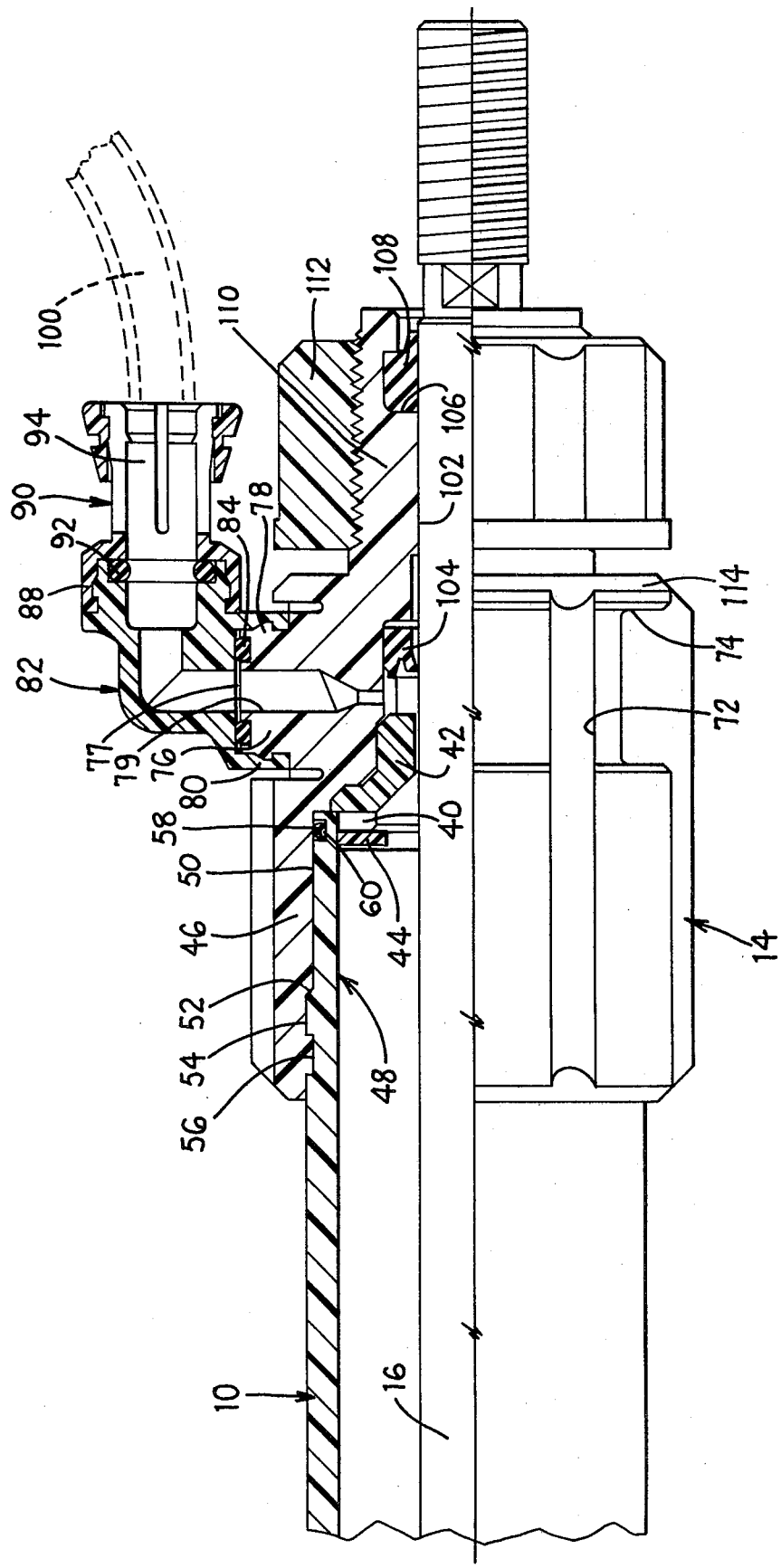

Turning now to the FIGS. 1A and 1B, and, more specially, to figure, it will be seen that, on cylinder or sleeve 10, which is molded using a high impact, somewhat elastic synthetic resin (as for example an acetal resin), there are two cylinder end pieces 12 and 14, molded of the same sort of synthetic resin. The one cylinder endpiece 14 has an opening through which a piston rod 16 extends the rod 16 having at its free, left hand end two piston keeper plates 18, 20 which will be seen in axial section to have between them a generally, T-shaped locking groove 22 for the root part 24 of a piston gland 28 with two lips 29, 30 and, between them, a guide part 32. The piston keeper plates 18 and 20 are placed on an end part 34 of lesser diameter than the rest of the piston rod 16 and are fixed in place between a radial shoulder 36 on piston rod 16 and the back side of a piston rod headpart 38.

A number of support teeth 40 with equal spacing angles between them are molded on the cylinder endpiece 12 and on a liner 42 of the cylinder endpiece 14, such teeth running out from the piston rod radially and supporting, in each case, a piston stop ring 44 made of polyurethane. The cylinder endpieces 12 and 14 have, in each case, axial skirt 46, such skirts being tightly and fittingly placed on the end parts 48 of the cylinder 10.

Referring to FIG. 1B, each cylinder endpart 48 has an axially outer surface or face part 50 of lesser diameter than the rest of the cylinder which comes to an end at a conical face 52, joining it up with a part 54 of the cylinder having the same outer diameter as the part of the cylinder 10 between the endpieces, and furthermore there is a locking groove 56 of rectangular cross-section, whose floor has the same diameter as the part 50 of the cylinder at 48. Near the end of part 48 there is, in the outer face of the cylinder, an annular groove 58 for a greased O-ring 60 of synthetic rubber which, when the actuator is put together, is acted upon by a radial force, that is to say a pre-loading force, and is kept fluid-tightly against the inner face of the skirt 46.

The inner face of each skirt 46 has the same shape as the cylinder end parts 48 but is complementary so that it has: a cylindrical face part 62 (FIG. 1A), whose axial length is the same as that of part 50, which is tightly housed within the skirt; a face part 64 increasing conically in diameter; a cylindrical face part 66, tightly placed on the face part 54; a locking lip 68 running in the circumferential direction and having a rectangular cross-section so as to be keyed in the locking groove 58, and an end part 70 tightly placed round the cylinder 10, stretching for a short distance therealong.

The outer faces of the skirts 46 have a number of lengthways axial grooves 72 running as far as and into a circumferential groove 74 of the skirt in question, groove 74 extending axially in width to a position a little short of the end of the cylinder 10.

In the groove 74, each cylinder endpiece 12 and 14 has a radially outwardly projecting pipe connection or stub 76 which, on its outer face, has a locking lip 78 with a horizontal locking shoulder and a sloping outer face. Received over the pipe connection 76 there is, in each case, a bell or sleeve part 80 of a 90° L-shaped elbow 82, which is held in position against axial movement but may be turned, its inner face being in the same shape, but complementary to, the outer face of pipe connection 76 and having a circumferential groove which receives lip 78. In an annular groove in the upper end face 77 (FIG. 1B) of pipe connection 76, a greased O-ring 84 of synthetic rubber is placed which, when the elbow is placed in position, is forced against a radial shoulder 86 within bell part 80 for giving a sealing effect.

A passageway 79 (FIG. 1B) is provided in each of the end parts 12 and 14, and extends between and communicates with the interior of the sleeve 10 and an opening which is provided in the face 77 and lies concentrically within the annular groove which has the O-ring 84 therein.

The outer face of the free end of elbow 82 is quite the same in shape as the pipe connection 76. The free end of the elbow is disposed in a bell part 88 which has complementary shape and is part of a gripping connection part. A fluid-tight joint between these parts is produced by an O-ring 92, which is acted upon by an axial pre-loading force, made of synthetic rubber, and is greased. The gripping connection part 90 has a number of gripping arms 94 and a gripping ring 96, which may be moved lengthways thereon. Elbow 82 and gripping connection part 90 are again made of a high impact and somewhat elastic synthetic resin, as for example acetal resin. Flexible pipes used for joining up the actuator with a pump or the like (not shown) are marked in broken lines at 98 and 100.

The stepped bore 102 within the cylinder endpiece 14 has a lipped gland 104 within it. At its free end, the hole 102 has an undercut groove 106 for supporting a stripper ring 108 of synthetic rubber. The gland 104 and ring 108 sealingly engage piston rod 16.

The outer surfaces of the two cylinder endpieces 12 and 14 have, in each case, a male threaded part 110, on which at nut 112 (FIG. 1B) may be screwed. Between the nut and a shoulder 114 on the cylinder endpiece 12 or, in the other case, 14, a fixing eyepiece (not shown) may be gripped and done up tight. The cylinder endpiece 12 has furthermore a hole 116 running through it crossways for a turnpin (not shown) for supporting the actuator.

An account will now be given of the putting together of the different parts of the actuator.

Piston keeper plates 18 and 20 with the root part 24 of the piston gland or washer 26 are pushed onto the end part 34 of piston rod 16 and locked in position by screwing the headpart 38 onto the end of the piston rod. The piston is now pushed into the cylinder 10, on which, earlier on, the O-rings 60 have been placed. Now the piston stop rings 44 are placed into the cylinder 10 from its two ends. Nextly, the cylinder endpieces 12 and 14 are slipped axially onto the cylinder 10 till their locking lips 68 are lockingly taken up in locking grooves 56 and then the elbows 82 ar pushed on to the pipe connections 76 till they are held in position by lip 78 and the associated groove and then the gripping connection parts 90 are put in position on generally the same lines.

It will be seen that it is possible for the cylinder end pieces 12 and 14 to be turned on the cylinder 10 on which they are supported without any damage to the fluid-tight joint and furthermore the elbows 82 may be turned into any desired angle and, more specially may be in a common plane passing through the axis of the actuator. For this reason, when putting the parts together, it is not necessary to give any attention to lining up the cylinder endpieces at all. This is quite different from the case of actuators with screwed-on endpieces on the cylinder, in which case the endpieces have to be lined up even when the actuator is put together in the factory producing it, because if the cylinder endpieces are twisted on the cylinder, the gaskets between the cylinder and the endpieces will be put under a greater or a lesser force.

In the case of the actuator noted, it is possible for the elbows 82 on the completed actuator to be simply turned into the positions best suited for the particular use to which the actuator is to be put.

Figure 2:
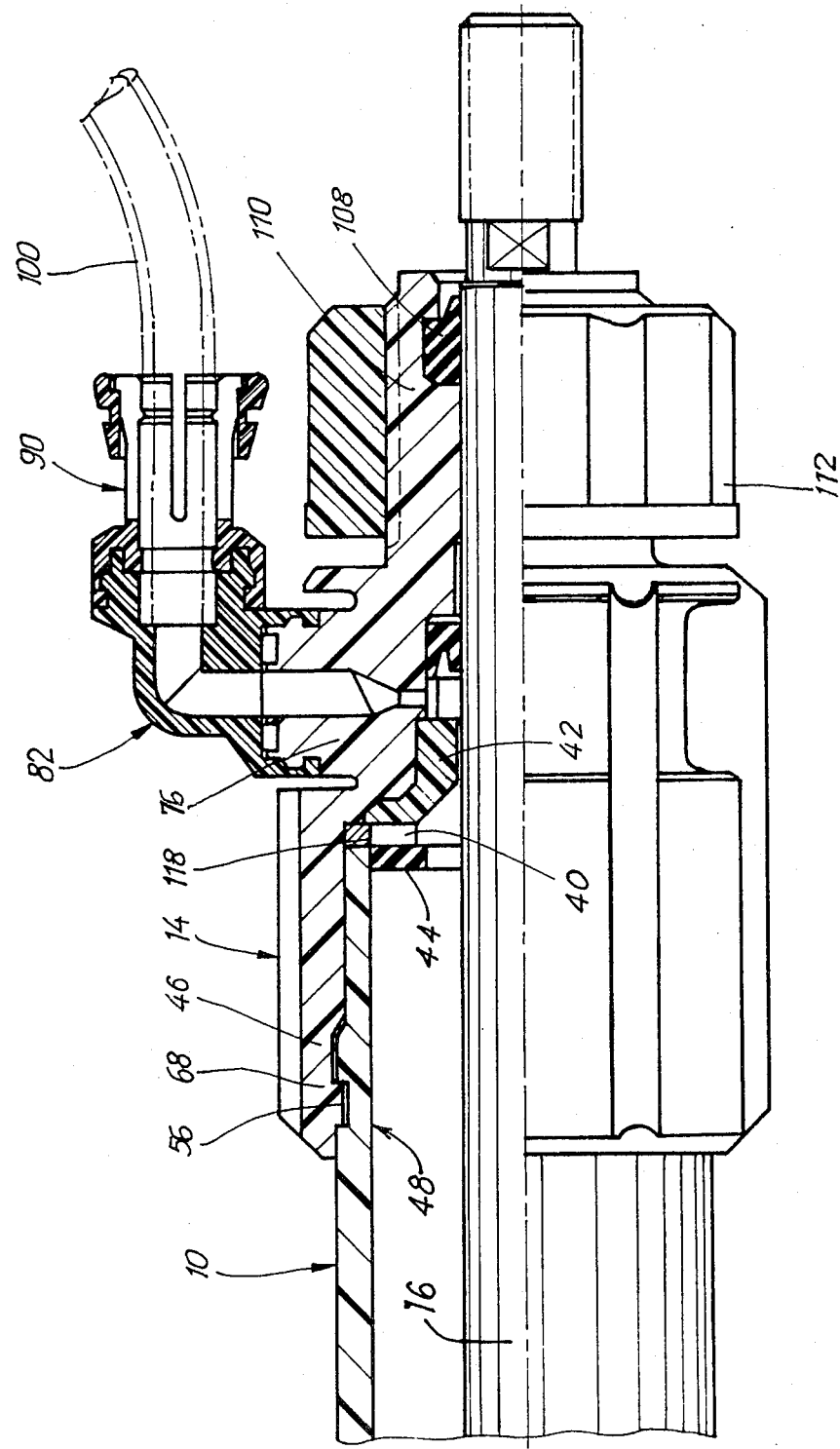
FIG. 2 is a fragmentary sectional side view similar to FIG 1B of a somewhat changed design of the inventive compressed air actuator.

The useful effects noted are furthermore produced by the actuator of FIG. 2 in which the parts noted earlier are given the same part numbers. The fluidtight joint between the cylinder endpieces 12 and 14 on the one hand, and the cylinder 10 is, however, produced by soft gasket washers 118, which take the place of the O-rings 60. Gasket washers 118 have, before being put in position and forced together, about twice the axial length they have when in position, in which they are compressed in the axial direction between the end faces of the cylinder 10 and shoulders 120, opposite thereto, on the cylinder endpieces 12 and 14. For this reason, such washers are able to take up any lengthways changes in position between the locking lips 68 and the locking grooves 56 and the free ends of the cylinder 10.

Gasket washers or rings, which may be used for this purpose, are best made of closed-pore moss rubber-like structures with an unbroken outer skin. In place of this it is, however, furthermore possible to make use of hollow gasket washers or rings. Because, when placed in the actuator, the gasket washers are acted upon by the working pressure within the cylinder, in the working example of FIG. 2 there is not only a fluid-tight joint produced by the elastic pre-loading of the gasket material, but furthermore a dynamic effect produced by the forces in question.

The actuator of FIG. 2 may be put together on quite the same lines as the actuator of FIGS. 1A and 1B.

It will be clear to the reader that the cylinder endpiece may be turned on it about its lengthways axis and, furthermore, the elbows may be turned about the radial pipe connections' axis which is normal to the lengthways axis of the cylinder. Furthermore, the bell parts, equal and opposite in shape to the ends of the elbow, of the gripping connection part may be turned at the free end about a horizontal axis. For this reason, generally speaking, it will be seen that there is the useful effect that there is a very wide selection with respect to the positions and angles of adjustment of the different connections of the actuator.

The embodiments of the invention in which an exclusive property or privilege is claimed are defined as follows:

1. In a fluid actuated device which includes a cylindrical sleeve, a piston axially slidably supported in said sleeve and sealingly engaging an inner surface thereof, two cylinder end parts which are each supported on and close a respective end of said sleeve and which each have a sleeve-like skirt portion which closely encircles the associated end of said sleeve, retaining means for retaining said end parts on said sleeve, said retaining means including cooperating, circumferentially extending locking grooves and locking ribs on said sleeve and said end parts, seal means for providing a fluid-tight seal between said sleeve and each said end part, means defining a passageway through each said end part which communicates with the interior of said sleeve on a respective side of said piston, and connection means on each said end part for facilitating connection of said passageway therein to a source of pressurized fluid, the improvement comprising wherein the outer surface of said sleeve includes a substantially cylindrical first surface portion at each end thereof which has a first djameter, a substantially conical second surface portion which is adjacent and diverges away from said first surface portion, a substantially cylindrical third surface portion which is adjacent said second surface portion on the side thereof remote from said first surface portion, said third surface portion having a second diameter greater than said first diameter and having a said circumferentially extending locking groove therein at a location spaced axially from said second surface portion, which locking groove has a substantially rectangular cross-section; wherein the inner surface of said skirt on each said end part has a shape complementary to the shape of the outer surface of the associated end of said sleeve and includes fourth, fifth and sixth surface portions which are disposed against respective said first, second and third surface portions on said sleeve, said sixth surface portion having a said circumferentially extending locking rib thereon which is received in said locking groove in said third surface portion, whereby each said end part is rotatable relative to but fixed against axial movement relative to said sleeve; wherein the outer surface of said skirt of each said end part has a plurality of circumferentially spaced, axially extending grooves therein; and wherein said connection means includes a respective L-shaped elbow pivotally supported on each said end part and having means defining a passageway therethrough which is in fluid communication with said passageway in such end part.

2. The device according to claim 1, wherein each said end part has means defining an axially facing annular shoulder adjacent and radially aligned with the associated end of said sleeve, and including a respective annular gasket disposed between each said end of said sleeve and said adjacent shoulder of said end part, each said gasket being manufactured of an elastomeric material and being axially compressed during assembly of said device.

3. The device according to claim 1, wherein said sleeve and said end parts are molded parts made of an impact-resisting, elastomeric plastic material.

4. The device according to claim 1, wherein said connection means includes a generally cylindrical connecting stub on each said end part, includes said elbows each having a cylindrical sleeve portion which is concentric with the axis of rotation of said elbow and receives the associated connecting stub, and includes means on the outer surface of each said connecting stub and on the inner surface of each said elbow sleeve portion defining cooperating, circumferentially extending locking grooves and locking ribs which permit said rotation of said elbow but prevent axial movement thereof relative to said sleeve, and including an annular seal disposed between each said sutb and elbow and providing a fluid-tight seal therebetween.

5. The device according to claim 4, wherein each said connecting stub projects substantially radially outwardly with respect to the axis of said sleeve, and wherein each said elbow has two legs arranged at substantially a right angle with respect to each other, said sleeve portion being located at the end of one of said legs.

6. The device according to claim 5, wherein each said connecting stub has a radially outwardly facing end surface at the end thereof, said end surface having means defining an opening therein and an annular groove therein which encircles said opening, said passageway in the associated end part communicating with said opening and said annular seal being disposed in said annular groove in said end surface, and wherein the associated elbow has an annular surface which engages said annular seal.

7. The device according to claim 1, including two piston stop rings which are manufactured of a relatively hard elastic material, and wherein each said end part has means for supporting a respective said piston stop ring within said sleeve near an end thereof.

8. The device according to claim 7, wherein said means for supporting a respective said piston stop ring includes means on at least one said end part defining a plurality of angularly spaced, radially extending, axially projecting teeth located within said sleeve adjacent one end thereof, the associated piston stop ring being disposed within said sleeve and against said teeth.

9. The device according to claim 7, wherein said means for supporting a respective said piston stop ring includes an annular liner supported within said skirt of one said end part and having thereon a plurality of circumferentially spaced, radially extending, axially projecting teeth located within said sleeve adjacent one end thereof, the associated piston stop ring being disposed within said sleeve and against said teeth.

10. The device according to claim 1, wherein said connection means includes a generally cylindrical connecting stub on each said end part, said connecting stubs each pivotally supporting a respective said elbow and extending at substantially a right angle with respect to the axis of said sleeve.

11. The device according to claim 1, including a circumferentially extending groove in each said first surface portion, and an elastomeric O-ring disposed in such groove and sealingly engaging said fourth surface portion on the associated end part.

12. The device according to claim 1, including means defining an opening in one said end part, a piston rod provided on said piston and extending through said opening, and an annular seal disposed within said opening and slidably sealingly engaging said piston rod.

* * * * *

UNITED STATES PATENT AND TRADEMARK OFFICE
CERTIFICATE OF CORRECTION

PATENT NO. : 4,452,128

DATED : June 5, 1984

INVENTOR(S) : Kurt Stoll

It is certified that error appears in the above-identified patent and that said Letters Patent is hereby corrected as shown below:

Column 6, line 62, please change "sutb" to ---stub---.

Signed and Sealed this

Thirtieth Day of October 1984

[SEAL]

Attest:

GERALD J. MOSSINGHOFF

Attesting Officer

Commissioner of Patents and Trademarks